June 22, 1937.                P. M. MILLER                2,084,405
                           AUTOMOBILE VEHICLE
                          Filed Nov. 15, 1933            4 Sheets-Sheet 1
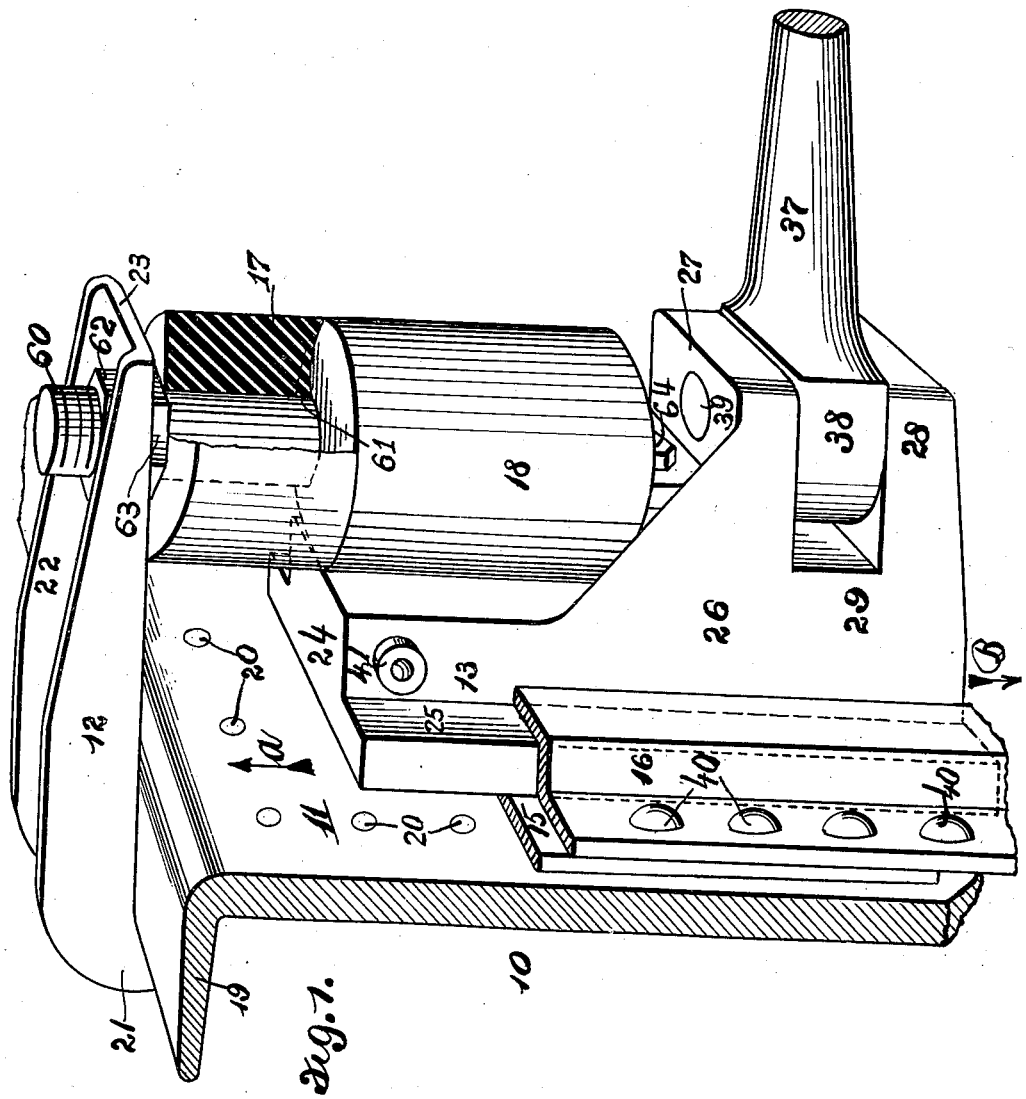
Inventor
Philip M. Miller June 22, 1937.  P. M. MILLER  2,084,405
AUTOMOBILE VEHICLE
Filed Nov. 15, 1933  4 Sheets-Sheet 2
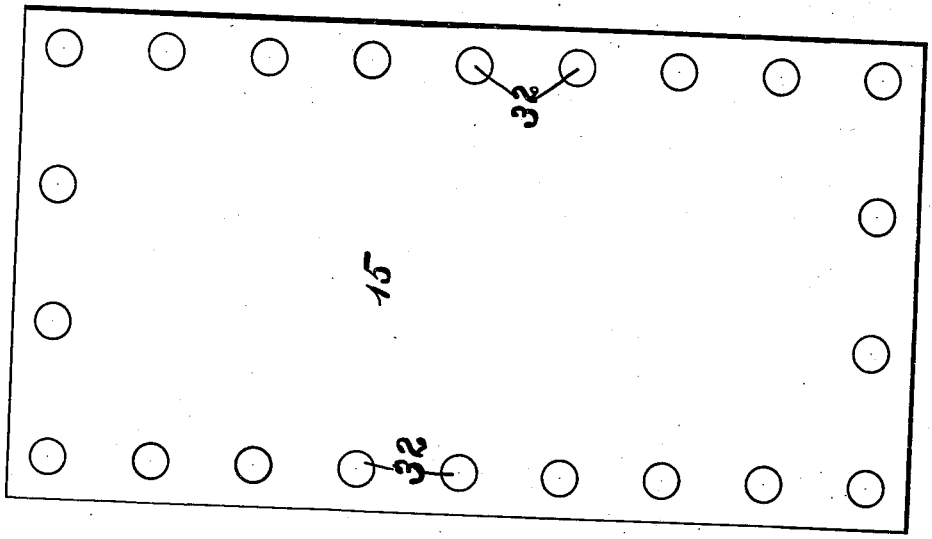
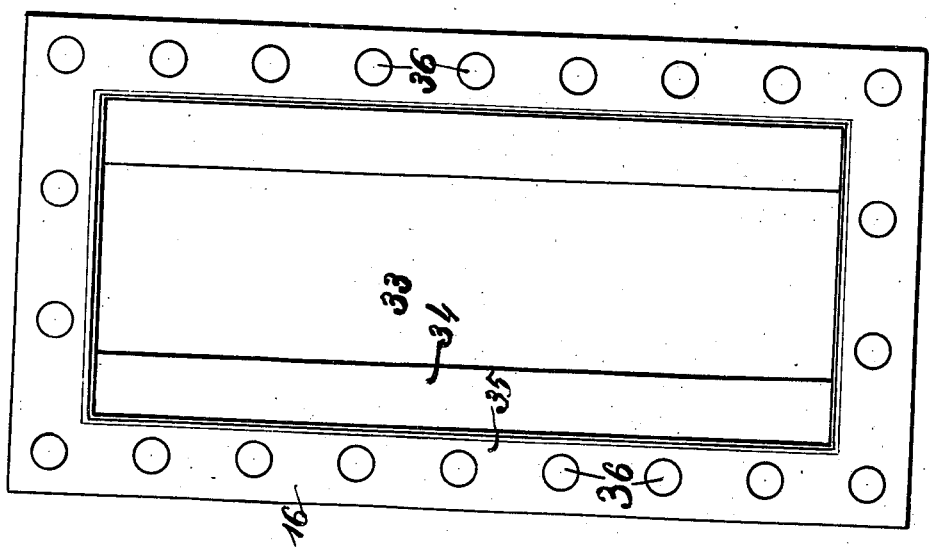
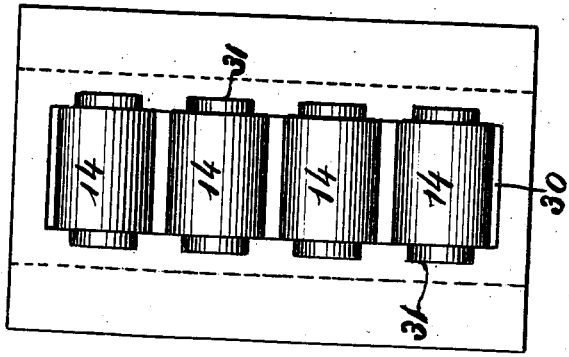

June 22, 1937.  P. M. MILLER  2,084,405
AUTOMOBILE VEHICLE
Filed Nov. 15, 1933.  4 Sheets-Sheet 3
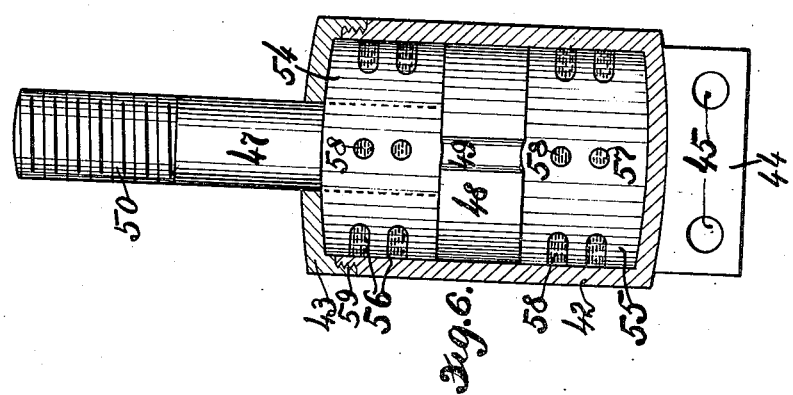
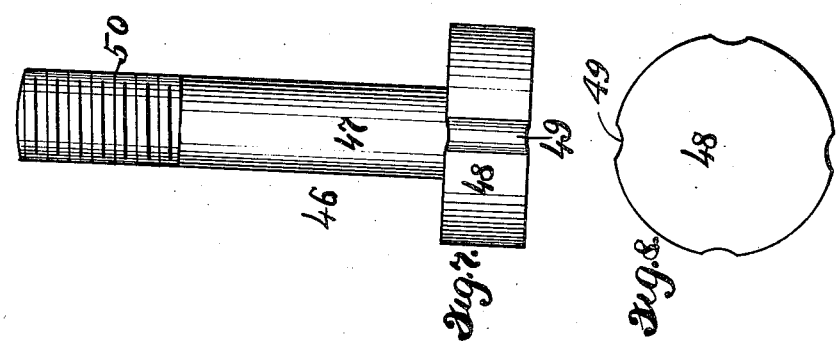
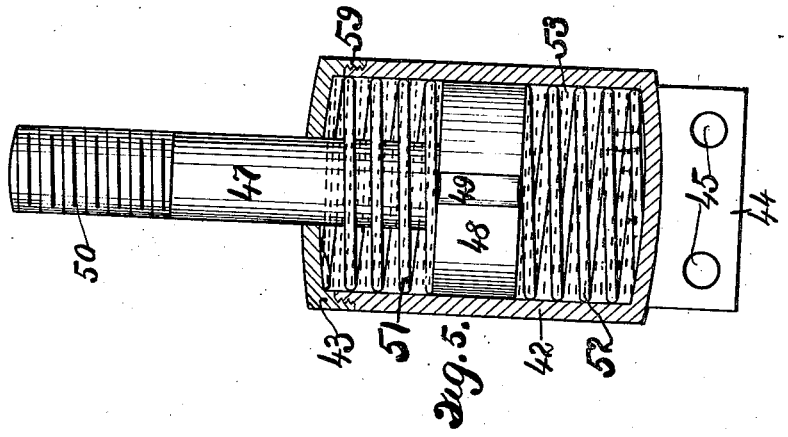
Inventor
Philip M. Miller

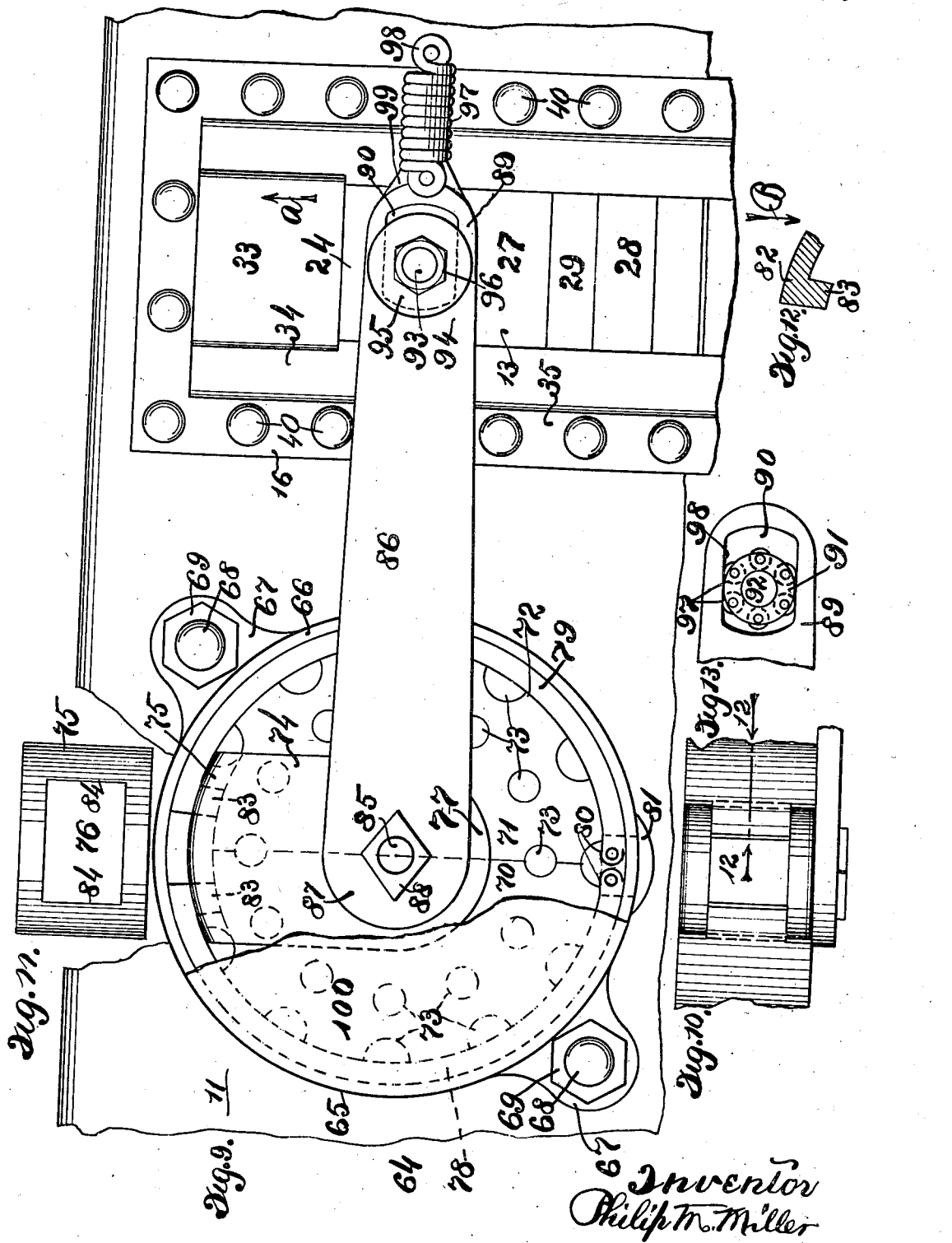

Patented June 22, 1937

2,084,405

UNITED STATES PATENT OFFICE 2,084,405

AUTOMOBILE VEHICLE

Philip M. Miller, Brooklyn, N. Y., assignor to Bendix Products Corporation, South Bend, Ind., a corporation of Indiana Application November 15, 1933, Serial No. 698,067

14 Claims. (Cl. 267—21)

This invention generally relates to a construction employed in connection with one side of the chassis of an automobile and adapted for employment with all sides thereof to take the place of the conventional operative devices connecting the conventional ground wheels with the chassis for carrying the load of the vehicle under load on the road.

The principal object of the present invention is to provide a device which is engaged with one side of the frame or chassis of the automobile to individually suspend the ground wheel for carrying the respective side thereof in driving service, without the employment of the conventional axle and spring.

Another object of the invention is the provision of an individually suspended wheel device slidably secured to the sides of the automobile chassis for the objective purpose of operating each ground wheel independently from the conventional spring and axle.

Another object of the invention is the provision of a device slidably engaged with one of the sides of the automobile chassis to carry a ground wheel in operative position independent of the conventional axle, spring and shock absorbing devices.

Another object of the invention is the provision of a device slidably attached to one of the ends of the automobile chassis to support and oscillatingly control the body weight of the vehicle, independently of the conventional axle, spring and shock absorbing members.

Another object of the invention is the provision of a device individually attached to one of the ends of the automobile chassis and carrying the conventional ground wheel to slidably operate in response to the oscillatory movement of the body of the vehicle.

Another object of the invention is the provision of an individual device attached to the end of the automobile chassis for slidable engagement with means thereof and carrying the conventional wheel to absorb shock from and prevent rebound of the automobile body in response to oscillatory movements thereof in connection with the movement of the automobile on the road.

Another object of the invention is the provision of an individual device attached to the end of the automobile chassis and carrying the conventional spindle with the conventional ground wheel, to vertically slidably move on the chassis in response to the oscillatory movement of the automobile body due to the weight thereof responding to obstructions on the road caused thereto while driving thereon, and to absorb the shocks transmitted to the automobile body and prevent rebound thereof.

Other objects and advantages of the invention will become obvious from the description of the accompanying drawings, in which Fig. 1 is a perspective view of a part of an automobile chassis to which is attached an individual device for slidable engagement along the face thereof, the frame of the chassis being in section and representing one of the ends thereof and the device being in section to show the interior structure thereof.

Fig. 2 is an inner face of the inner end of the main slidable member of the device, showing the construction thereof.

Fig. 3 is a view showing the inner construction of a yoke member holding the main slidable member in operative position with reference to the face of the automobile chassis.

Fig. 4 is a view of a plate upon which the main slidable member is operatively positioned, the plate being fastened with the yoke member to the automobile chassis.

Fig. 5 is a longitudinal cross section of one of the members constituting the device shown in Fig. 1.

Fig. 6 is a view similar to Fig. 5 of a modified form.

Fig. 7 is a perspective view of a piston member constituting an operative part of the constructions shown in Figs. 5 and 6.

Fig. 8 is an end view of the piston member shown in Fig. 7.

Fig. 9 is a view similar to Fig. 1 of a modified form.

Fig. 10 is an outer end view of assembled members.

Fig. 11 is a perspective view of one of the members constituting means of operating the device shown in Fig. 9.

Fig. 12 is a cross section of Fig. 10 taken on the line 12—12 as indicated by the arrows.

Fig. 13 is a view of an end assembly of the operating lever employed in connection with the device shown in Fig. 9.

With the conventional automobile chassis usually an axle is employed to support side springs which are connected with the frame of the automobile, and other accessory parts including shock absorbers are employed to complete the structure. This assembly is obviously exceedingly expensive and adds materially excessive weight to the automobile.

Owing to the arrangement and construction of the parts of the device employed in connection with the automobile chassis, the total cost of producing the automobile is materially decreased as well as the unsprung weight is eliminated. The conventional axle and springs are totally eliminated, as well as the conventional shock absorbers employed to control and absorb shocks of the automobile body are eliminated.

The assembly device 10 shown in Fig. 1, comprises an end portion 11 of a chassis, a member 12 fixed to the chassis and extended therefrom, a shackle member 13, a series of rollers 14 associated with the inner face of the shackle member 13, a bearing plate 15 upon which are the rollers 14 engaged, a yoke member 16 straddling over the sides of the shackle 13 to hold it in slidable engagement with the plate 15, a rubber element 17, and a shock and absorbing means engaged with the extension member 12 and the shackle member 13.

The frame 19 is of the conventional type of construction which may be of any other type, is provided with openings 20 and upon which is fixed the member 12 at 21 which may be in any preferable manner arranged to convenience the construction and arrangement thereof.

The member 12, which may be of any preferable construction, is provided with side walls 22 and an intermediate base 23 for the purpose of rendering rigidity thereto.

The shackle member 13 comprises an intermediate reduced portion 24 integrally formed with side portions 25, a laterally outwardly extended body 26 formed with the inner portion of the intermediate body 24, from which extend two bodies 27 and 28 having between a reception cavity 29, and a cavity 30 is provided in the inner face of the inner portion of the intermediate body 24 wherein are a series of roller members 31 for the purpose which will hereinafter be described, having the side portions of the roller members 14 engaged with the cavities 31 provided therein.

The plate member 15 which may be of any preferable shape, is provided with openings 32 to correspond to the number of openings 20 provided in the sides of the frame member 19.

The yoke member 16 is provided with a central longitudinal opening 33 in the intermediate longitudinal laterally outwardly extended body 34 which is formed with side portions 35, and a series of openings 36 are provided in the sides thereof, the openings to correspond to the number of openings 32 in the plate member 15 and the openings 20 in the frame of the chassis 11.

To complete the construction of the shackle member 13 for cooperative operation, the conventional axle spindle 37 is secured in the recess 29 by having the inner terminal portion 38 engaged therein and pivoted by pin 39, in the conventional manner to provide a pivotal joint therebetween, to carry the conventional ground wheel.

In order to assemble the shackle member for operation, the roller members 14 are positioned as particularly shown in Fig. 2, with the side projections in the seats 31 to permit free rotation thereof in the respective seats, so that the intermediate bodies of the roller members are free from contacting with the wall of the chamber 30. When the roller members are so arranged, the shackle member is turned with the inner face into contact with the plate member 15 having the roller members therebetween, and the yoke member is then arranged over the sides 25 thereof and having the portion 26 passed through the opening 33 in the yoke member and the sides 34 of the latter in engagement with the sides 25 of the shackle member, thereby to provide a slidable engagement between the parts and permit the roller members to revolve in contact with the outer face of the plate member 15. When the parts are so assembled the sides of the members 15 and 16 are riveted to the frame 11 of the chassis by having rivets passed through the openings 20, 32, and 36 and headed at 40, as particularly shown in Fig. 1. In the side of the intermediate body 24 is secured a grease passing nipple 41 through which a lubricant is passed to the interior thereof for lubricating the roller members 14.

As a result of having the parts assembled and rigidly secured to the frame of the chassis, the shackle member 13 with the spindle 37 is capable of moving slidably vertically with reference to the vehicle chassis, owing to pressure applied thereto by the load of the vehicle body supported by the ground wheels thereof.

For the purpose of providing an individually operative wheel device for a diversified number of automobile vehicles, I prefer to employ a number of modified auxiliary shock absorbing and rebounding constructions of applications, Serial Nos. 268,331 and 295,573, respectively filed April 7 and July 26, 1928.

Referring to Fig. 5, a shock absorbing and rebounding device is shown which comprises two casings 42 and 43 threaded together to complete the casing thereof, the lower part of the casing having an attaching portion 44 wherein are openings 45. An operating piston 46 which forms a part of the device, is formed with a stem or column 47 integral with a head 48 in the side of which are by-passes 49, and a threaded surface 50 is formed at the opposite end of the column. Prior to locking both casings 42 and 43, the piston head 48 is arranged in the casing carrying the spring member 51 on its outer face encircling the inner portion of the column 47, and resting on the spring member 52 which is deposited in the lower portion of the casing 42, with the outer portion of the column 47 passed through the casing 43 which is threaded to the casing 42 at 59, thereby having the piston head 48 between the spring members 51 and 52.

Instead of employing the spring members 51 and 52 I utilize the rubber elements 54 and 55 arranged in the casings 42 and 43, in the same manner as the spring members are located, with the column 47 passed through the rubber element 54 and through the casing 43 and having the head 48 between the rubber elements 54 and 55. The rubber elements are provided with openings 56, 57 and 58 whereby to increase the resiliency or elasticity thereof, and a lubricant 53 is deposited around the rubber elements and in the openings therein.

With reference to the detail description of operation of the hereinbefore described shock absorbing and rebounding constructions it is obvious that these constructions are operated in accordance with the detail description in the application, Serial No. 268,331 and it is unnecessary to again describe the same.

In order to control the vertically sliding movement of the shackle assembly 13 and 37 on the outer face of the plate member 15 between the inner sides 34 of the yoke member 16, I mount the controlling device 18, which may represent the closed complete shock absorbing and rebounding construction shown in Fig. 5 or shown in Fig. 6, on the outer face of the intermediate body 24 of the shackle member, with the threaded portion 60 passed through the opening in the member 23 and locked in position by nuts 62 and 63, while the projection 44 is locked with the inner portion at 64 to form a rigid engagement with the body 24. When required, the threaded portion 60 may be passed through the opening 61 in the rubber block 17 and locked by the nuts 62 and 63.

In connection with the hereinbefore described assembled parts 11, 12, 13, 14, 15, 16, 17 and 18 forming a complete wheel driving construction, it is obvious that the piston member 46, shown in Figs. 5, 6 and 7, is fixed at 62 and 63 and is free to move between the spring members 51 and 52 or between the rubber members 54 and 55 having the head 48 operated therebetween to compress the respective spring and rubber members in a vertical direction in response to pressure applied to the movable parts of the complete construction as a result of having the construction operated in connection with a vehicle under load on the road. Owing to the depositing of the lubricant 53 in the construction shown in Fig. 5 or the lubricant 58 shown in Fig. 6, the parts contained in the respective casings are lubricated and materially assist the spring and rubber members to maintain pressure within the casings in order to support the weight of the vehicle body when in driving service on the road. The by-passes 49 in the piston head 48 permit the passage of the lubricant in the casing from one part to the other part thereof in order to relieve excess pressure created in the casting to permit free movement of the piston member. Normally the piston head 48 rests on the spring member 52 or rubber member 55 when the vehicle is not in motion, with the opposite end thereof in engagement with the member 23 which may be fixed to the frame of the chassis at another point, and the spring member 51 or rubber member 54 is inactive. When the vehicle body is oscillating due to the driving motion of the vehicle on the road under load, the latter spring member or rubber member controls the rebounding of the vehicle body and simultaneously causes retraction of the piston head to the opposite spring member or rubber member to a cushioning position and reaction to again move the piston head into action until the cessation of vibration of the vehicle body.

Referring to Fig. 9, the disclosure comprises a device 64 of a modified form employed with a chassis, and consists of hereinafter described parts or members. The particular parts 11, 13, 14, 15, 16 and 37 are utilized in connection with the usual frame of chassis of a vehicle, and in this case the shock absorbing and rebounding construction 65 with its accessory parts is employed instead of the shock absorbing and rebounding construction hereinbefore described. The shackle member 13 is pivotally provided with the spindle member 37 and the wheel supports the vehicle body in the same manner as hereinbefore described and shown in Fig. 1, The device 65 comprises a casing 66 provided with ears 67 which are secured to the frame of the vehicle chassis by bolts 68 and nuts 69 to form the casing a rigid part thereof. A plurality of elastic members 70 and 71 are circumferentially arranged in the casing at 72. In the elastic members 70 and 71 are openings 73 which are adapted to increase the resiliency thereof. A U-shaped or horseshoe member 74 formed with an arcuate periphery 75, embraces the periphery of both elastic members 70 and 71 at their joint, the periphery of the U-shaped member having a longitudinal slot 76, while the opposite end 77 being free and forming an engaging portion. Around the periphery of the elastic members 70 and 71 are circularly aligned two metal bands 78 and 79 which are pivoted at 80 by the member 81 which is fixed to the casing 66 while the hooked portion 82 thereof is engaged by the projecting portion 83 with the side 84 of the peripheral portion 75 of the U-shaped member, thereby aligning the hooked portions of the circular metal bands 78 and 79 in the slot 76 in snug engagement therewith, to prevent separation of the ends of the metal bands and form means whereby the bands are movable diametrically with reference to the elastic members, which will hereinafter be described. As the prongs 83 are so in the slot 76 engaged with the side portions of the periphery of the U-shaped member 74 and the opposite ends of the bands are fixed to the casing, the metal bands are snugly aligned between the inner face of the casing flange and the periphery of the circumferentially aligned elastic members, in the manner that separation of the band hooked portion from the portions 84 of the U-shaped member is not effected. For holding the elastic members 70 and 71 in normal position with reference to the casing 66, a pin 85 is passed through the elastic members for pivotal engagement of the pin with the casing and rigid engagement with the lever 86 having its extremity 87 rigidly fixed to the outer portion of the pin 85 at 88 to prevent their separation and form one part for moving the U-shaped member 74 circumferentially around the periphery of the elastic members, which will hereinafter be described. The lever 86 extends transversely from the U-shaped member outwardly across one of the elastic members to a position for sliding engagement with the body 24 of the shackle member 13 in the manner which will hereinafter be described. The slidable end 89 of the lever 86 is provided with a slot 90 between the sides of which is fixed a roller bearing member 91. The bearing member is provided with a central opening 92 through which is passed the projection 93 rigidly extended from the body 24 of the shackle member 13 for pivotal or rotatable engagement of the roller bearing member 91 with the projection 93. To the outer face 94 of the terminal 89 is aligned a bearing member 95 which holds the roller bearing member 91 in normal position with reference to the sides of the slot 90 in the terminal portion 89, and a nut lock 96 is threaded on the projection 93 to prevent separation of the assembled parts and hold them in sliding engagement one with another. As an auxiliary means to control the movement of the parts, a spring member 97 is secured to the frame of the chassis at 98 and to the terminal portion at 99.

As is obvious, the shock absorbing and snubbing construction forms a permanent fixture of the frame of the chassis, while the shackle assembly also forms a permanent fixture thereof, thus the shackle member 13 is adapted to move vertically with reference to the chassis of the automobile, in the manner that the plate member 15 forms means whereupon the rollers 14 are revolving in response to pressure applied to the shackle member, and that the latter member is held in sliding engagement by the yoke member 16.

When the shackle member assembly is moved slidably upward the lever member 86 is moved to an oblique angle with the slotted portion 89 upward and the portion 87 downward to a level position which is lower than the level position of the portion 89, thereby causing revolving of the bearing member 91 in the slot 90 and move the U-shaped member 74 into a position that the hooked portion 83 of the metal band member 79 is tensioned around the periphery of the elastic member 71 thereby to check abnormal movement of the shackle assembly upward and the automobile body downward in the manner that shocks are absorbed and rebound of the body is prevented, and when the movement of the shackle assembly is reversed the angle of the lever is reversed so that the portion 89 is on a higher level than the level of the portion 87 and the U-shaped member 74 is moved into opposite position thus causing tension of the metal band 78 around the periphery of the elastic member 70, thereby controlling the abnormal oscillation of the automobile body and absorb shocks and prevent rebound thereof. The spring member 97 obviously forms auxiliary means in assisting properly controlling of the abnormal oscillating of the automobile body and securing the portion 89 of the lever 86 to stabilize the movement of the shackle assembly on the plate member 15 and the contact with the yoke member 16 while the shackle member is moved in the directions A and B as indicated by the arrows.

The shock absorbing and snubbing device 65 is enclosed by a cover 100 for the purpose of preventing ingress of foreign substances into the interior thereof, and the portion 87 of the lever member 86 is mounted on the outer face of the cover 100.

I am aware that modifications, variations and substitutions can be had without departing from the scope and spirit of the claims and the herein described and disclosed invention is new, and therefore I claim broadly the following:

1. The combination of a chassis of a vehicle and a device consisting of a series of assembled parts in association of one with another and secured to the chassis and operative relative thereto in combination with a ground wheel carried by said device, the device being vertically and angularly operative with reference to the chassis in response to power applying thereon by oscillatory movements of the vehicle body caused thereto by the said ground wheel revolving on road pavement, said device being adapted to control the irregular oscillatory movements of the vehicle body with reference to the chassis, comprising a shackle member having pivotal engagement with a wheel axle spindle at its outboard side and rolling engagement with rotating elements at its inboard side, a yoke member engaging with the chassis and holding the shackle member in inseparably sliding engagement with the chassis, and compressible means including leverage means adapted to control the movements of the device.

2. The combination of a chassis of a vehicle and a device consisting of assembled parts including a ground wheel carrying member and an auxiliary shock controlling member in operative association with said device collectively arranged on means relative to the chassis, said device being slidably operative and said shock controlling member being contractibly operative to move said device in response to vibratory movements of the vehicle body caused thereto by revolving of the vehicle ground wheel on road pavement, thereby controlling the oscillatory movements of the vehicle body with reference to the chassis and absorbing shocks transmitted thereto by the ground wheel while encountering obstructions on irregular road pavement, which comprise a shackle member formed with an outboard portion having pivotal engagement with the axle spindle of the wheel and rotatable elements arranged at its inboard face, a yoke member having engagement with the inboard side portion of the shackle member and being fastened to the chassis for holding the shackle member in inseparable engagement with means of the chassis, and resilient means including leverage means controlling the movements of the other parts of the device.

3. The combination of a chassis of a vehicle and a slidable device including a contractible device operatively associated with said slidable device, in combination with a ground wheel carried by said slidable device, cooperatively secured to parts of the chassis, the said slidable device and said contractible device being operative in response to vibratory movements of the vehicle body caused thereto by revolving of said ground wheel on road pavement, thereby controlling the irregular vibratory movements of the vehicle body with reference to the chassis, and absorbing shocks caused to the vehicle body in encountering obstructions by the revolving ground wheel on road pavement, which comprise a shackle member having pivotal engagement with the wheel axle spindle and carrying bearing members at its inner face, a yoke member fitted over the shackle member and engaging with the sides thereof and fastened to the chassis, and the contractible device comprising a casing secured to the shackle member and encasing resilient elements and a longitudinal member through said elements and having a head between the resilient elements and a portion secured to a part of the chassis adapted to respond to the movements thereof for causing said resilient elements to contract and normally expand for absorbing shocks.

4. The combination with a chassis, of a shock absorbing device comprising a plate fastened to the chassis; a shackle member formed with a channel at its inner face and a laterally-outwardly extended portion having bifurcated knuckle portions; a series of roller members spacedly positioned in said channel of the shackle member to freely revolve therein; said shackle member being arranged on said fastened plate with said roller members in contact with said plate to revolve thereon; and a yoke member formed with a longitudinal slot, the said laterally outwardly extending portion of the shackle member passing through said slot, the said yoke being fastened to the chassis to hold said shackle member in operative slidable position vertically of the chassis; a ground wheel carrying member pivoted between and with said knuckle projections to swing laterally with reference to the chassis; a ground wheel mounted on said wheel carrying member; and an auxiliary operative device in association with said shock absorbing device and the chassis, comprising a casing secured to the shackle member and having elastic elements within and a piston between and through said elastic elements and secured to a part of the chassis adapted to move said shackle member vertically of the chassis in response to power applied on said means by oscillatory movements of the body of the vehicle with reference to the chassis, thereby controlling the movements of the body with reference to the chassis and absorbing shocks transmitted to the body through the chassis by the ground wheel while revolving on road pavement and encountering obstructions thereon.

5. The combination with a chassis, of a chassis and a ground wheel suspension device comprising an assembly of members collectively fastened to the chassis and slidably operative with reference to the chassis, which comprise a vertically movable member formed with a channel at its inner face and an outwardly-laterally extended bifurcated portion, bearing means in said channel, an axle spindle pivoted in and with the said bifurcated portion of the movable member, a ground wheel mounted on said axle spindle and an assembly of members collectively fastened to the chassis in association with said first assembly of members, both said assemblies of members being adapted to control the vibratory movements of the chassis with reference to the rotatory movements of the ground wheel, thereby absorbing shocks directed to the chassis through the wheel while revolving on road pavement and encountering obstructions thereon, said assembly of members comprising a casing fastened to the vertically movable member, resilient members within the casing, a member having a head between the said resilient members and passing therethrough and secured to a part of the chassis.

6. The combination with a chassis, of an individual wheel suspension device comprising an assembly of members secured to the chassis and having a slidable member comprising a body formed with a channel in the inboard side face carrying rotatable means and a laterally-outwardly extended bifurcated portion having pivotal engagement with a wheel axle spindle, and another assembly of members secured to means of the chassis in operative association with said slidable member which comprises a casing enclosing an operative member and compressible means adapted to operate said first assembly of members, a ground wheel carried by means of the axle spindle of said slidable member, the latter member with said wheel responding to the load of the chassis to move vertically with reference to the chassis, and said second assembly of members, responding to the load of the chassis to control the irregular movements of said slidable member with reference to the chassis, thereby tranquilling the abnormal vibratory movements of the chassis with reference to the ground wheel and absorbing shocks transmitted to the chassis by violent vertical movements of the wheel caused thereto by irregular road pavement while revolving thereon.

7. The combination of a chassis of a vehicle and a device consisting of assembled parts, a certain part of which comprises a shackle member formed with a longitudinal and laterally outward deep channel, an outward laterally extended portion defined by side portions integral with the main body of said shackle member, rolling elements arranged in said channel of the shackle member, a yoke member formed with a longitudinal slot in the intermediate portion thereof, which is defined by side engaging portions integral therewith, the inner portion of said shackle member being in contact with a part of the chassis and having the said rolling elements therebetween, said yoke member with its side portions fitting over the side portions of the shackle member and having the outward laterally extended portion of the shackle member passed through the slot of the yoke member, means fastening the yoke member to the part of the chassis, thereby permitting vertical movement of the shackle member in relation with the rolling elements on the part of the chassis, and an auxiliary device secured in position in association with said former device, comprising means which consists of a casing enclosing resilient members and an operative member, whereby the movements of the former are controlled by the movements of the latter.

8. The combination of a chassis of a vehicle and an operative device in association with a part of the chassis, comprising a member formed with a deep channel at its inboard face and a laterally outwardly extended portion having pivotal engagement with a spindle member, rolling elements arranged in said channel, a yoke member formed centrally with an opening, the said member with said rolling elements being in contact with said part of the chassis and having the latter rolling elements between the said part and the inboard face of the member, said yoke member being fitted over the member with the laterally outwardly extended portion thereof passed through the opening of the yoke member, means fastening the parts in position relative to the chassis, the member being adapted for vertical moving in relation to the chassis upon pressure applied to the chassis, and an auxiliary device secured in position relative to and in association with said former device, comprising a casing enclosing movable members adapted to control the movements of the latter device and chassis in response to pressure applied to the chassis.

9. The combination of a chassis of a vehicle and a device consisting of assembled parts, one part of which is slidable comprising a shackle member having pivotal engagement with a spindle member and an inner channel adapted to enclose rolling elements, other parts of which are rotatable and secured in said channel, a third part of which is fixed to the chassis, and a fourth part of which comprising means holding the said former parts in relative positions with reference to the chassis for vertically moving with reference to the side of the chassis upon pressure applied to the chassis, and means secured to the chassis and in association with said device for controlling the movements of the chassis to exert pressure normally on the device upon application of pressure on the chassis, comprising a casing enclosing yieldable members and an operative member having a head between said yieldable members and a portion extending through one of the members and secured to the chassis.

10. The combination of a chassis of a vehicle and a device assembly attached to a part of the chassis adapted for slidable and rotatable movements with reference to the chassis in response to pressure exerted thereupon, comprising a shackle member carrying rolling members engaged with said part of the chassis and held in slidable engagement by a yoke member which is fastened to the chassis and through an opening of which said shackle member passes for pivotal engagement with a wheel spindle, and an auxiliary device attached to another part of the chassis and is in operative engagement with a part of the former device for angularly, circumferentially and contractibly controlling the violent movements of the shackle member with reference to the chassis and controlling the violent movements of the chassis with reference to the shackle member, thereby absorbing the shocks and preventing abnormal rebounding of the chassis upon the application of pressure thereupon.

11. The combination of a chassis of a vehicle and a device of assembled parts secured to the chassis and vertically slidably operative in response to the load of the vehicle body oscillating while the vehicle is moving on the road pavement, comprising a shackle member having pivotal engagement with a wheel axle spindle, rolling elements arranged between the chassis and shackle member, a yoke member having an opening passed over the outer portion of the shackle member and fastened to the chassis adapted to hold the shackle member and rolling elements in operative positions, and another device comprising a casing, elastic elements in the casing and an operative member having a portion lying between said elements and a portion extending through one of the elements into engagement with a part of the chassis secured to the chassis and in operative engagement with said first device adapted to control the movements of said shackle member and rolling elements and to absorb shocks transmitted to the body of the vehicle.

12. The combination of a chassis of a vehicle and a device comprising assembled parts, one of which being vertically slidable and having rotatable elements in association to operate for efficient movement of said slidable part, means securing said parts in position in relation with the chassis, a member pivoted in the outer portion of said vertically slidable part adapted for carrying a ground wheel, and auxiliary assembled parts comprising a casing in association with the vertically slidable part and enclosing yieldable means and an operative member, said operative member being in operative relation with said yieldable members and extending outwardly into engagement with the chassis, and a yieldable member mounted in association with the outer portion of said operative member and interposed between the outer portion of the casing and a part of the chassis, thereby supporting the load of the chassis and body of the vehicle and preventing abnormal movement of the chassis and body when the vehicle is traveling on the road under load and transmitting vibratory shocks to the chassis and wheel thereof.

13. The combination of a chassis of a vehicle and a device comprising a vertically movable member assembly secured to a part of said chassis, and a device secured to a part of the chassis in association with said vertically movable member, comprising a casing arranged in rigid position in relation to the movable position of the vertically movable member, contractible means in said casing, an operative member in the casing in operative association with said contractible means and extending outwardly therefrom, and a contractible member, the outer portion of said operative member passing through said contractible member, said contractible member interposing between the outer portion of the casing and a part of the chassis, said outer portion of the operative member being secured to a part of the chassis to operate in association with the casing and the contractible means in the casing to control the movement of the vertically movable member in response to the vibratory movements of a ground wheel thereof when the vehicle is traveling on the road under load, thereby controlling and absorbing shocks transmitted to the chassis and wheel.

14. The combination of a chassis of a vehicle and a chassis-supporting and shock-absorbing device in association with parts thereof, said device comprising members arranged for yielding in response to vibratory movements of the chassis under load of the body of the vehicle and having rotatable connection with a ground wheel, and a device mounted on means of the chassis in association with the first said device, comprising an assembly of encased yieldable members and a member operating said yieldable members, said last device being adapted to control the movements of the first said device and support the body of the chassis for effective alignment of the movable parts of the first said device with reference to the chassis, thereby effecting means for controlling the vibratory movements of the chassis and ground wheel of the vehicle when traveling on the road under load.

PHILIP M. MILLER.